United States Patent

[11] 3,628,239

| [72] | Inventors | John William Archibald Hunt<br>Northfield;<br>Bernard Alan Potter, Kings Heath, both of<br>England |
|---|---|---|
| [21] | Appl. No. | 796,324 |
| [22] | Filed | Feb. 4, 1969 |
| [45] | Patented | Dec. 21, 1971 |
| [73] | Assignee | Joseph Lucas (Industries) Limited<br>Birmingham, England |
| [32] | Priority | Feb. 9, 1968 |
| [33] | | Great Britain |
| [31] | | 6,463/68 |

[54] METHOD OF MAKING DYNAMO MACHINES
2 Claims, 2 Drawing Figs.

[52] U.S. Cl. ................................................ 29/596,
310/42, 310/156, 310/218
[51] Int. Cl. ........................................................ H02k 15/00
[50] Field of Search .......................................... 29/596,
598, 609; 310/42, 156, 218

[56] References Cited
UNITED STATES PATENTS

| 1,991,046 | 2/1935 | Bohli ............................ | 29/598 X |
| 2,335,378 | 11/1943 | Bernard ....................... | 310/156 |
| 2,475,776 | 7/1949 | Brainard ...................... | 310/156 |
| 2,655,611 | 10/1953 | Sherman ...................... | 29/598 X |
| 2,739,253 | 3/1956 | Plumb .......................... | 310/156 |
| 3,077,026 | 2/1963 | Blackburn .................... | 29/598 |

*Primary Examiner*—John F. Campbell
*Assistant Examiner*—Carl E. Hall
*Attorney*—Holman & Stern ABSTRACT: A method of manufacturing a permanent magnet rotor including the steps of positioning a plurality of permanent magnets between a central polygonal core and an outer pole assembly so that the magnets are in contact with both the pole assembly and respective faces of the core, then deforming at least one axial end of the core to prevent relative axial movement between the core and the magnets, encapsulating the unit thus formed, and then removing portions of the pole assembly to separate the poles.

PATENTED DEC 21 1971

3,628,239

INVENTOR
John William Archibald Hunt, Bernard Alan Potter.
BY Holman, Hascock
Downing & Seebold
ATTORNEYS

METHOD OF MAKING DYNAMO MACHINES

This invention relates to a method of manufacturing permanent magnet rotors for dynamo electric machines.

A method according to the invention includes the steps of positioning a plurality of permanent magnets between a central polygonal core and an outer pole assembly, so that the magnets are in contact with both the pole assembly and respective faces of the core, deforming at least one axial end of the core to prevent relative axial movement between the core and the magnets, encapsulating the unit thus formed, and removing portions of the pole assembly to separate the poles.

Figure 1:
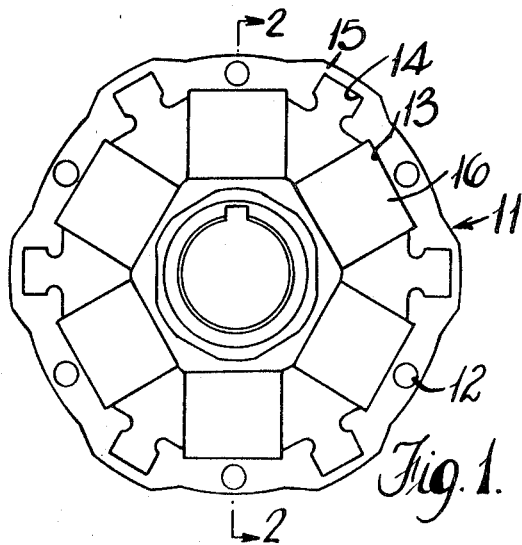
Figure 2:
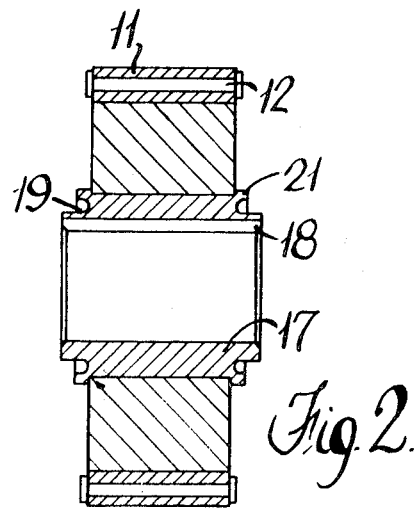

In the accompanying drawings,

FIG. 1 is an end view of a partly completed rotor manufactured according to one example of the invention, and FIG. 2 is a longitudinal section through FIG. 1.

Referring to the drawing, a pole assembly 11 is built up from a plurality of identical mild steel laminations, which are secured together, by axially extending rivets 12, or by any convenient means for example projection welding. The inner surface of the pole assembly includes a plurality of axially extending channels 13 each of which has a flat base. Between adjacent channels the pole assembly is formed with respective axially extending grooves 14 which are deeper than the channels 13, the outer surface of the pole assembly adjacent each of the grooves being enlarged to define axially extending ribs 15. A plurality of permanent magnets 16 of rectangular cross section, are engaged in the channels 13 respectively. The magnets extend radially inwardly of the pole assembly and define a polygonal aperture at the center of the pole assembly.

A mild steel core 17 of polygonal cross section is engaged in the aperture defined by the magnets, and each of the magnets engages a respective face of the core. The core is formed with a through bore which includes a keyway 18 through which the core may be nonrotatably engaged with a driving shaft. The axial ends of the core are each formed with a circular groove 19, which is concentric with the bore of the core, and in order to secure the core against axial movement relative to the magnets 16, the outermost upstanding flange 21 defined between the outer surface of the core and the outer wall of the groove 19 is deformed to lie in contact with the axial ends of the magnets. The preferred method of deforming the core is to engage a pair of electrodes with the respective ends of the core and to pass a high current through the core so that the flanges 21 are heated. Simultaneously with the heating of the flanges 21, the electrodes move towards one another so that the flanges 21 are deformed. It is found that in addition to deforming the core, the procedure described above also resistance welds the magnets to the core at points adjacent the deformation of the core. Thus the magnets are held relative to the core, not only by the deformation of the core, but also by a weld between each of the magnets and the core.

When the core has been deformed, the assembly is placed in a mould which is then filled with molten aluminum. The molten aluminum fills all the open spaces within the assembly, with the exception of the bore and the keyway in the core. The encapsulated assembly is then machined to cylindrical form by removing the ribs 15 on the outer surface of the pole assembly, so that the pole assembly is divided into a plurality of separate poles each of which is associated with one of the magnets 16. The grooves 14 are shaped to define keys which retain the poles in position in the rotor.

In use, the rotor assembly is mounted on a driving shaft, and a key is inserted into the keyway 18 and extends into a corresponding keyway in the shaft so that the rotor assembly and the shaft rotate as one. The rotor assembly is then positioned within a wound stator in conventional manner.

Having thus described our invention what we claim as new and desire to secure by Letters Patent is:

1. A method of manufacturing a permanent magnet rotor for a dynamo electric machine, said method including the steps of:

positioning a plurality of permanent magnets between (1) a central polygonal core having radially extending flanges on either axial end thereof, and (2) an outer pole assembly which includes a plurality of interconnecting poles, so that the magnets are in contact with both the pole assembly and respective faces of the core;

applying heat and pressure to the flanges of the core to deform the flanges about the permanent magnets and to effect a weld between the permanent magnets and the flanges so that the permanent magnets are trapped in an axial direction between the deformed flanges and are held relative to the core;

thereafter encapsulating the unit thus formed; and removing portions of the pole assembly to separate the poles.

2. A method as claimed in claim 1 in which the magnets are located in angularly spaced channels in the pole assembly, the portions of the pole assembly between the channels defining ribs which are removed to separate the poles and the ribs having therein grooves which are shaped to define surfaces which key into the encapsulation.

* * * * *